Oct. 20, 1970 R. H. FICHTNER 3,535,459

STEREOPHONIC F.M. RECEIVERS HAVING AUTOMATIC SWITCHING MEANS FOR STEREO RECEPTION

Filed Nov. 20, 1967

INVENTOR.
ROLAND H. FICHTNER

BY [signature]

PATENT AGENT

United States Patent Office 3,535,459
Patented Oct. 20, 1970

3,535,459
STEREOPHONIC F.M. RECEIVERS HAVING AUTOMATIC SWITCHING MEANS FOR STEREO RECEPTION

Roland H. Fichtner, Waterloo, Ontario, Canada, assignor to Electrohome Limited, Kitchener, Ontario, Canada Filed Nov. 20, 1967, Ser. No. 684,248
Int. Cl. H04h 5/00
U.S. Cl. 179—15 7 Claims

ABSTRACT OF THE DISCLOSURE

"Motorboating" of an F.M. receiver adapted to reproduce both monaural and stereophonic signals is avoided by means of a rectifying device that rectifies a part of the switching voltage appearing in the tuned output circuit of a frequency doubler, thereby producing a DC bias voltage that is applied between the base and emitter electrodes of the frequency doubler transistor to reduce the reverse bias applied between these electrodes, whereby a stronger stereophonic signal is required to switch the decoder from the monaural to the stereophonic operating condition than is required to switch the decoder from the stereophonic to the monaural operating condition.

Figure 1:
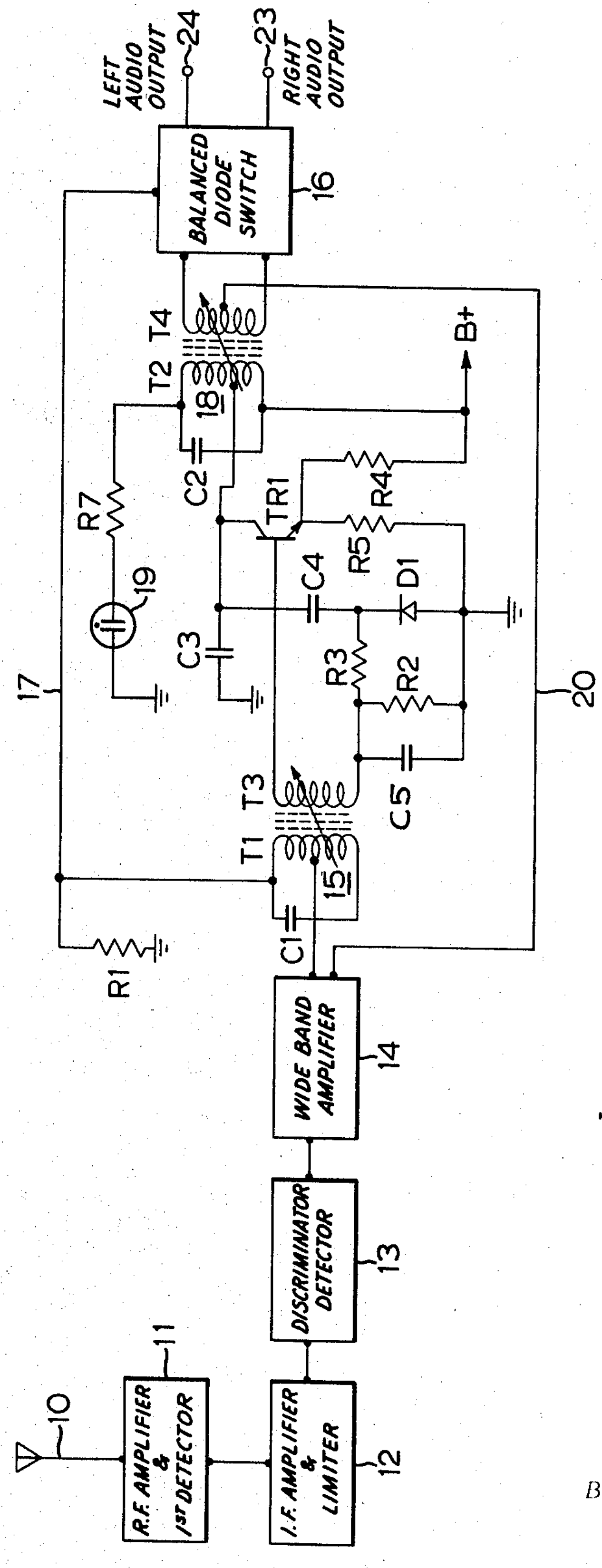

This invention relates to F.M. receivers. More specifically, this invention relates to stereophonic decoders for F.M. receivers.

In accordance with regulations currently prescribed by the F.C.C. in the United States and D.O.T. in Canada, the composite signal for use in F.M. multiplex transmission must have the following mathematical form:

$$M(t)=(L+R)+(L-R)\cos\omega t+P\cos\frac{\omega}{2}t$$

where:

M($t$) is the composite signal
L is the left channel audio signal
R is the right channel audio signal
P is the pilot carrier amplitude
$\omega=2\pi f$, $f$ presently being 38 kHz.

In the foregoing equation, $(L+R)$ is the sum of the left and right audio channel signals and, therefore, is called the monophonic signal. An F.M. receiver which is not equipped to reproduce stereophonic signals will reproduce the $(L+R)$ signal only. $(L-R)\cos\omega t$ represents the difference between the left and right audio channel signals amplitude modulated onto a 38 kHz. carrier which is suppressed prior to transmission of the composite signal $$P\cos\frac{\omega}{2}t$$

is a 19 kHz. pilot carrier.

It will be noted that the amplitude modulated carrier (38 kHz.) is harmonically related to the pilot carrier (19 kHz.), the frequency of the latter being exactly one half of the frequency of the former. In addition, the amplitude modulated carrier and the pilot carrier are in phase. The pilot carrier is a necessary part of the composite signal, since it serves the function of reintroducing the suppressed 38 kHz. carrier into the composite signal in the F.M. multiplex receiver. It can be said that the pilot carrier is a synchronization signal for the correct decoding of the composite signal at the receiver.

In addition to the foregoing components, the composite signal may contain an S.C.A. signal for store casting or subscription music transmission, the use of this signal by the broadcaster being optional. The bandwidth of the S.C.A. channel presently is 67±7 kHz.

The monophonic signal can frequency modulate the F.M. broadcast carrier up to 80%, if S.C.A. is present, or up to 90% with no S.C.A., of the maximum modulation (±75 kHz.) permitted by the F.C.C. and D.O.T. regulations. The stereophonic signal also can modulate up to 80% with both side bands, or 40% with each side band, of the maximum modulation if S.C.A. is present, these figures being 90% and 45% respectively with no S.C.A. The pilot carrier modulates up to 10%, i.e., ±7.5 kHz. assuming 100% modulation to be ±75 kHz. Thus, for F.M. multiplex transmission, present regulations require an RF signal which may be modulated by the following signals in the noted frequency bands:

$L+R$ from 0 to 15 kHz.,
$L-R$ in the form of ±(0 to 15) kHz. sidebands of 38 kHz. sub-carrier with carrier suppressed and in the band 23 to 53 kHz.
A pilot carrier at 19 kHz.,
A subsidiary carrier (S.C.A.) having a bandwidth from 60 to 74 kHz.

In an F.M. multiplex receiver a decoder must be provided to derive the audio L and R signals and separate them from each other for individual reproduction. In a conventional F.M. receiver adapted to reproduce both monaural and stereo signals, it is common practice to provide for automatic switching, i.e., when a stereo signal with its 19 kHz. pilot carrier is being received and is of a predetermined minimum strength, the stereo decoder of the receiver will switch automatically from a monaural operating condition to a stereophonic operating condition, and when the 19 kHz. pilot carrier is absent from the signal being received, the decoder will revert automatically to its monaural operating condition.

It is very desirable that a stronger signal should be required to effect the switching from the monaural operating condition to the stereo operating condition than would be required for switching from the stereo operating condition to the monaural operating condition. This will prevent what is known as "motorboating," such as would otherwise occur if the signal strength were just above the level required to effect switching from the monaural operating condition to the stereo operating condition and from time to time varied in strength to just below the switching level.

In the past "motorboating" has been prevented by the use of a Schmitt trigger circuit (a bistable multivibrator using two transistors). The Schmitt trigger circuit is driven by the current from a frequency doubler, this current being indicative of the pilot carrier level of the incoming signal. The output signal from the trigger circuit is used to light an indicator lamp for stereo operation, and it may be used to D.C. bias the diodes of a balanced diode switch for monaural operation.

In accordance with this invention there is provided a circuit arrangement which prevents "motorboating" and in which the trigger circuit is eliminated, being replaced by a diode, thereby reducing transistor requirements from 3 to 1 at the cost of an added diode.

In a circuit embodying this invention there is a frequency multiplier that includes an input circuit, an output circuit and a transistor having a reverse biased base-emitter junction. The input circuit includes a tuned circuit tuned to the frequency of the pilot carrier, while the output circuit includes a tuned circuit tuned to the frequency of the suppressed carrier. A rectifying device rectifies at least a part of the switching voltage developed across the tuned output circuit, and the resultant D.C. bias voltage is applied between the base and emitter electrodes of the frequency multiplier transistor to reduce the reverse bias of the base-emitter junction thereof.

Figure 2:
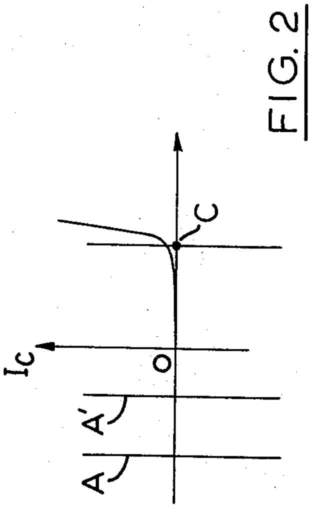

This invention will become more apparent from the following detailed description, taken in conjunction with the appended drawings, in which:

FIG. 1 shows a part of an F.M. radia receiver that includes a stereo decoder embodying this invention; and FIG. 2 shows the *Ic* versus *Vbe* characteristic of the frequency multiplier transistor of FIG. 1.

Referring to FIG. 1, F.M. signals are received by an antenna 10 and are amplified and detected by a conventional RF amplifier and first detector 11. The detected signal is amplified and limited by a conventional IF amplifier and limiter 12, and the composite signal representing the modulation of the received signal then is detected by a conventional discriminator detector 13. This signal is amplified by a wide band amplifier 14 and applied to a stereo decoder embodying this invention.

As shown in FIG. 1, there is provided a parallel tuned network 15 consisting of the primary winding T1 of a transformer and a capacitor C1 connected in parallel with primary winding T1. Parallel tuned network 15 is tuned to the frequency of the pilot carrier (19 kHz. in accordance with present F.C.C. and D.O.T. regulations) of the composite F.M. signal received by antenna 10. A signal from amplifier 14, which has a high output impedance, is applied to centre tap on primary winding T1. One terminal of tuned network 15 is connected via resistor R1 to ground as well as to a balanced diode switch 16, this latter connection being via a conductor marked 17 and being the means whereby one signal from amplifier 14 is applied to diode switch 16. Balanced diode switch 16 may be of any known type. It may be, for example, of the type shown and described in copending Canadian patent application Ser. No. 894,625, filed Feb. 1, 1964, for Stereophonic Decoder For Frequency Modulated Signals, assigned to the same assignee as this invention (U.S. application Ser. No. 429,421, filed Feb. 1, 1965).

A transistor TR1 connected in common emitter configuration and operating in Class C constitutes the active element of a frequency doubler network. In the output circuit of this frequency doubler there is a parallel tuned circuit 18 which is tuned to 38 kHz., i.e., to the frequency of the suppressed carrier or twice the frequency of the pilot carrier. Tuned circuit 18 consists of the primary winding T2 of a transformer and a capacitor C2 that is connected in parallel with winding T2. The collector electrode of transistor TR1 is connected to a tap on winding T2. A capacitor C3 is connected between the tap on winding T2 and ground and serves to suppress high frequency ringing. Bias resistors R2, R4 and R5 for transistor TR1 are provided. Resistor R4 is connected between the emitter electrode of transistor TR1 and the positive terminal of a DC power supply (B+), while resistor R5 is connected in voltage divider relationship with resistor R4 between the emitter electrode of transistor TR1 and ground. One terminal of tuned circuit 18 is connected to the positive terminal of the DC power supply, while the other terminal is connected via a resistor R7 and a neon tube stereo indicator lamp 19 to ground.

A coupling capacitor C4 is connected between the tap on primary winding T2 and the cathode of a diode D1, the anode of diode D1 being connected to ground. Coupling capacitor C4 couples a part of the 38 kHz. voltage developed across tuned circuit 18 to diode D1 where this 38 kHz. voltage is rectified. The resultant DC voltage developed across diode D1 is filtered by a filter constituted by a resistor R3 and a capacitor C5. Resistor R3 is connected between one terminal of the secondary winding T3 of the transformer having windings T1 and T3 and the common terminal of capacitor C4 and diode D1. Capacitor C5 is connected between ground and the terminal of resistor R3 connected to the aforementioned terminal of secondary winding T3. The other terminal of secondary widning T3 is connected to the base electrode of transistor TR1. Resistor R2 is connected between ground and the common terminal of resistor R3 and capacitor C5. It provides a DC return path for both transistor TR1 and diode D1 and stabilizes the base-emitter bias condition of transistor TR1 so that leakage current cannot cause an uncontrolled variation in this bias condition.

The secondary winding T4 of the transformer of which T2 is the pirmary winding is connected to balanced diode switch 16, so that a switching voltage may be applied to balanced diode switch 16 when the receiver is receiving a composite signal that is of a minimum predetermined strength and that includes a 19 kHz. pilot carrier. As is conventional, wide band amplifier 14 is connected via a conductor 20 to a centre tap on secondary winding T4.

The operation of circuit of FIG. 1 now will be described. If no 19 kHz. pilot carrier is present in the signal being received, transistor TR1 will be cut off, i.e., the base-emitter junction thereof will be reverse biased via resistors R2, R4 and R5. Consequently, there will be no current flowing in the collector circuit of transistor TR1, and the stereo decoder will be in its monaural operating condition.

When a signal of a minimum predetermined strength and that includes a 19 kHz. pilot carrier is being received, the positive peaks of the voltage developed across winding T3 will drive transistor TR1 into conduction, collector current pulses will flow in the collector circuit of transistor TR1 and a 38 kHz. switching voltage will be developed across winding T2. The switching voltage will be applied to diode switch 16 via secondary winding T4 and its connections to the balanced diode switch. A part of the 38 kHz. voltage developed across tuned circuit 18 will be coupled from tuned circuit 18 to diode D1 via capacitor C4 and rectified by diode D1. The DC voltage developed across diode D1 will be filtered by the filter consisting of resistor R3 and capacitor C5 and applied to the base electrode of transistor TR1 and reducing the reverse bias of the base-emitter junction of transistor TR1. This will increase the amplitude of the collected current pulses supplied to tuned circuit 18, which in turn will increase the amplitude of the voltage coupled to diode D1 and rectified, so that the reverse bias of the base-emitter junction of transistor TR1 will be further reduced. This avalanche effect continues until transistor TR1 saturates, which limits the voltage developed across winding T2. In this manner a second stable bias condition for transistor TR1 is reached, and the decoder now is operating in its stereophonic mode. At some time during the switching of the decoder from its monaural mode to its stereophonic mode sufficient voltage will be developed across winding T2 to fire indicator lamp 19, which provides a visual indication that the decoder is operating in its stereophonic mode.

While it is desirable to provide a filter, which, in the embodiment of FIG. 1 is constituted by resistor R3 and capacitor C5, the provision of a filter may not be necessary. However, if it is omitted, care will have to be taken to ensure that the frequency doubler network does not oscillate. Means other than a filter might be employed to ensure that this oscillation does not result from 38 kHz. feedback to the base electrode of transistor TR1.

It will be understood, of course, that during stereo operation balanced diode switch 16 will be driven by the 38 kHz. switching voltage from winding T4, thereby resulting in proper decoding of the stereo signal with the left audio signal being supplied to the output terminal 24 of balanced diode switch 16 and the right audio signal being supplied to the output terminal 23 of this switch. It will be understood that these signals may be further amplified, if necessary, and then applied to loudspeakers or other sound reproducing devices.

Should the signal being received now drop slightly below the minimum level required to effect switching from the monaural to the stereo operating condition, switching from the stereo operating condition to the monaural operating condition will not result because of the reverse bias applied to the base electrode of transistor TR1 previously having been reduced in magnitude. If the signal strength drops appreciably below this minimum level, however, the positive peaks of the voltage developed across winding T3 will cease to drive transistor TR1 into conduction, collector current pulses no longer will be supplied to tuned circuit 18, no 38 kHz. switching voltage will be developed across winding T2, indicator lamp 19 will extinguish, and the decoder will revert to its monaural operating condition.

It will be appreciated, of course, that should the signal being received change from a signal with a 19 kHz. pilot carrier to a signal without such a pilot carrier, the decoder will switch automatically to its monaural operating condition regardless of signal strength.

In FIG. 2 there is shown the I*c* versus V*be* characteristic of transistor TR1. The line A designates the base-emitter bias voltage of this transistor when no signal is being received or when a monaural signal is being received. The line A′ designates the base-emitter bias voltage of transistor TR1 when it is limiting. Point C indicates the turn on voltage of the transistor. Transistor TR1 operates in Class C, and, in order for it to draw current, it is necessary for a signal to be applied to its base electrode having a peak to peak amplitude greater than 2(C–A). In other words, in order for the decoder to switch from its monaural operating condition to its stereophonic operating condition, the signal applied to the base electrode of transistor TR1 must be greater than 2(C–A). However, because of the reduction in the reverse bias of the base-emitter junction of transistor TR1 that occurs when the transistor turns on, the signal strength of the stereophonic signal can drop in level to a peak to peak amplitude of only 2(C–A′) before transistor TR1 will draw no more current, and, obviously, 2(C–A) is considerably larger than 2(C–A′). The magnitude of bias voltage can be varied by changing the value of resistor R4 or resistor R5. The magnitude of bias voltage A′ can be varied by changing the value of resistor R2 or capacitor C4.

It will be apparent from a consideration of FIG. 2 that the magnitude of bias voltage A determines the minimum signal that will cause transistor TR1 to turn on. This bias voltage can be adjusted so that low level and hence noisy signals will not turn on transistor TR1. Thus, when a stereophonic signal is being received, as soon as its peak to peak amplitude reaches 2(C–A), the frequency doubler will be driven quickly into limiting because of the bias change from A to A′. This is important because noise thereby is prevented from riding through the frequency doubler to diode switch 16.

In the circuit of FIG. 1, transistor TR1 is the active element of a frequency doubler network. A part of this network is constituted by a circuit 18 tuned to the frequency (38 kHz.) of the suppressed carrier. While present F.C.C. and D.O.T. specifications make the use of a frequency doubler necessary, it will be appreciated that should these regulations change, a frequency quadrupler, for example, might be required. Also this invention can be readily employed with certain bridge detection networks where a multiple frequency of the 38 kHz. carrier is used. In this case too, transistor TR1 could operate as frequency quadrupler.

While preferred embodiments of this invention have been disclosed herein, those skilled in the art will appreciate that changes and modifications may be made therein without departing from the spirit and scope of this invention as defined in the appended claims.

What I claim as my invention is:

1. In an F.M. receiver adapted to receive a composite signal containing a monophonic signal $(L+R)$, a pilot carrier and the sideband frequencies of a carrier suppressed carrier amplitude modulated by an $L-R$ signal, said suppressed carrier being of a frequency harmonically related to the frequency of said pilot carrier, and to separate L and R audio frequency signals from said composite signal, a decoder adapted to switch automatically from a monaural operating condition to a stereophonic operating condition when a signal containing said pilot carrier and of a minimum predetermined strength is being supplied thereto and also adapted to switch automatically from said stereophonic operating condition to said monaural operating condition when a signal containing said pilot carrier and of a strength lower than said minimum predetermined strength is being supplied thereto, said decoder also being adapted to switch automatically from said stereophonic operating condition to said monaural operating condition when a signal that is without said pilot carrier is being supplied thereto, said decoder comprising a frequency multiplier network for producing a switching voltage at a frequency corresponding to an integral multiple of the frequency of said pilot carrier; said frequency multiplier including an input circuit, an output circuit, a transistor having base, collector and emitter electrodes and means for applying a reverse bias between said base and emitter electrodes; said input circuit including a first tuned circuit tuned to the frequency of said pilot carrier and means coupling said first tuned circuit to said base electrode of said transistor to supply a signal at the frequency of said pilot carrier to said base electrode of said transistor when a signal containing said pilot carrier is supplied to said first tuned circuit, said output circuit including a second tuned circuit tuned to the frequency of said switching voltage and means connecting said collector electrode of said transistor to said second tuned circuit to supply collector current pulses from said collector electrode of said transistor to said second tuned circuit; and means for reducing automatically said reverse bias in response to an increase in the collector current of said transistor, said last-mentioned means including rectifying means connected to said second tuned circuit for rectifying at least a part of said switching voltage appearing across said second tuned circuit and thereby producing a D.C. bias voltage, and means for applying said D.C. bias voltage between said base and emitter electrodes of said transistor with the polarity required to reduce said reverse bias.

2. The invention according to claim 1 wherein said rectifying means is a diode.

3. The invention according to claim 1 wherein said means for applying said D.C. bias voltage includes a filter for filtering said D.C. bias voltage.

4. The invention according to claim 3 wherein said rectifying means is a diode and said filter is connected between said diode and said base electrode of said transistor.

5. The invention according to claim 4 including a coupling capacitor, said coupling capacitor being connected between said second tuned circuit and said diode.

6. The invention according to claim 1 wherein said means for applying a reverse bias between said base and emitter electrodes include a power supply having first and second terminals at different D.C. potentials and first, second and third resistors, said first resistor being connected between said first terminal and said emitter electrode, said second resistor being connected between said emitter electrode and said second terminal, said third resistor being connected between said base electrode and said second terminal.

7. The invention according to claim 6 wherein said rectifying means is a diode having first and second electrodes and wherein said means for applying said D.C. bias voltage includes a filter for filtering said D.C. bias voltage, said filter including a first capacitor and a fourth resistor, said multipler also including a coupling capacitor, said coupling capacitor being connected between said second tuned circuit and said first electrode of said diode, said second electrode being connected to said second terminal, said fourth resistor being connected between said first electrode and said base electrode, said first capacitor being connected between said base electrode and said second terminal.

References Cited

UNITED STATES PATENTS

| | | | |
|---|---|---|---|
| 3,264,414 | 8/1966 | Santilli | 179—15 |
| 3,242,264 | 3/1966 | De Vries | 179—15 |

KATHLEEN H. CLAFFY, Primary Examiner

T. J. D'AMICO, Assistant Examiner